United States Patent
Assel et al.

(10) Patent No.: US 11,573,857 B2
(45) Date of Patent: Feb. 7, 2023

(54) METHOD FOR THE SECURED STORING OF A DATA ELEMENT IN AN EXTERNAL MEMORY AND INTERFACE MODULE

(71) Applicant: Robert Bosch GmbH, Stuttgart (DE)

(72) Inventors: Martin Assel, Markgroeningen (DE); Axel Aue, Korntal-Muenchingen (DE); Matthias Schreiber, Vaihngen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/317,353

(22) Filed: May 11, 2021

(65) Prior Publication Data

US 2022/0027237 A1 Jan. 27, 2022

(30) Foreign Application Priority Data

Jul. 21, 2020 (DE) .......................... 102020209133.1

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673
See application file for complete search history.

(56) References Cited

U.S. PATENT DOCUMENTS

| | | | |
|---|---|---|---|
| 2011/0252288 A1* | 10/2011 | Sharon | G06F 11/1048 714/E11.006 |
| 2017/0192842 A1* | 7/2017 | van Ruymbeke | G06F 11/1016 |
| 2021/0358559 A1* | 11/2021 | Suh | G11C 29/42 |

* cited by examiner

*Primary Examiner* — Kyle Vallecillo
(74) *Attorney, Agent, or Firm* — Norton Rose Fulbright US LLP; Gerard Messina

(57) ABSTRACT

A method for the secured storing of a data element in an external memory, which is connected to a microcontroller via an interface module, which is configured to calculate memory addresses for data to be stored and for error correction values. The method includes receiving the data element to be stored by the interface module, a calculation by the interface module of a memory address in the external memory for the data element to be stored, and a writing, starting at the memory address, of the data element and of the error correction value via the interface module into the external memory, the error correction value immediately following the data element being written and the writing taking place within one addressing phase. A corresponding interface module, a corresponding microcontroller, and a corresponding control unit are also described.

13 Claims, 2 Drawing Sheets

METHOD FOR THE SECURED STORING OF A DATA ELEMENT IN AN EXTERNAL MEMORY AND INTERFACE MODULE

CROSS REFERENCE

The present application claims the benefit under 35 U.S.C. § 119 of German Patent Application No. DE 102020209133.1 filed on Jul. 21, 2020, which is expressly incorporated herein by reference in its entirety.

FIELD

The present invention relates to a method for the secured storing of a data element in an external memory and to an interface module, to a microcontroller and to a processing unit for carrying out the method.

BACKGROUND INFORMATION

In working memories such as SRAM, Flash, PCM or DRAM, it is possible, in addition to the data bits, to store additional bits for correcting errors or identifying errors, referred to as "Error Correction Code," in order to secure the data content. Single bit errors or multi-bit errors within a data element may thus be identified and corrected as a function of the number of the bit errors within the data element.

In embedded systems, for example, control units of machines or vehicles, so-called microcontrollers are used which include, in addition to one or multiple processor cores, a particular limited amount of internal working memory, in which programs and data are stored during execution. For this working memory, in particular, for safety-critical applications, for example, in motor vehicles, an error correction method may be implemented in the microcontroller with the aid of ECC.

Typical SRAM memory cells used as working memories in microcontrollers include 6 transistors and are accordingly relatively expensive and complex to manufacture, hence, the working memory integrated into the microcontroller is frequently dimensioned only large enough to be sufficient for basic applications. An internal expandability of the working memory is usually not provided or is not possible in microcontrollers for reasons of cost, since the working memory is integrated with the processor cores in one chip.

In order to also enable the implementation of applications, which access a working memory larger than is provided on the microcontroller, it is possible to connect an external working memory via a communication interface, for example, an SPI interface (Serial Peripheral Interface). This external working memory may be cost-efficiently designed in the form of DRAM memory cells that require only one transistor. However, no error correction function is implemented in available externally connectable working memories.

SUMMARY

According to the present invention, a method for the secured storing of a data element in an external memory and an interface module, a microcontroller and a processing unit for carrying out the method are provided. Advantageous embodiments of the present invention are described herein.

According to the method provided in accordance with an example embodiment of the present invention, the data element and the associated error correction value (hereinafter also ECC value) are written within a single addressing phase of the memory, an independent address calculation for determining a memory address for the ECC value and a further longer address access during an independent addressing phase for the ECC value are omitted. This is advantageous, since memory access times with respect to a handling of data elements and ECC values independent of one another are reduced as a result.

The calculation of the memory address and of the ECC value is carried out by the interface module. This module is designed as a hardware module of the microcontroller. A corresponding functionality which is implemented in the processor core or as software is unnecessary. Accordingly, a modification of existing processor cores or software is not necessary. The interface module is designed, in particular, as a module for a serial data bus, in particular, as a SPI module (Serial Peripheral Interface).

The interface module is configured to map memory addresses of data elements in the address space of the microcontroller (so-called logical memory addresses) into memory addresses (for the data elements) of the external memory (so-called physical memory addresses), the ECC value, i.e., its memory space requirement being taken into account during the mapping.

An arbitrary suitable error correction function, for example, a Hamming code, may be used as an error correction method or error identification method for calculating the ECC value. Such methods are conventional to those skilled in the art.

The external memory connected via the interface module may be, in particular, a volatile memory, which is used by the microcontroller as a working memory, i.e., a DRAM memory (DRAM, Dynamic Random Access Memory). The application of the method with a non-volatile memory is also possible, however.

"Addressing phase" is understood here to mean a memory access (writing or reading) in which, starting with a start address, a particular number of successive bits (or bytes) (i.e., to be stored or stored at successive addresses) is written or read. The start address is referred to as the memory address of the corresponding data.

The method includes preferably a read operation of the written data element from the memory, the read operation including: a determination of the memory address of the data element by the interface module; a reading of the data element and of the ECC value from the memory within one addressing phase; a calculation of an error correction comparison value (hereinafter also ECC comparison value) from the read data element by the interface module; and a comparison of the ECC comparison value by the interface module with the read ECC value, in order to establish whether these are the same or not the same. The read operation further preferably includes: a transmission of the read data element if the ECC comparison value and the read ECC value are the same, or if the ECC comparison value and the read ECC value are not the same, transmission of a data element corrected on the basis of the read data element and of the read ECC value.

The calculation of memory address and ECC comparison value are again carried out by the interface module. During the read operation, the memory address must be determined or recalculated, since the memory address represents a physical address that indicates the actual memory location in the memory, whereas from the perspective of a computer program or of the microcontroller including the interface module, the one or the other of which intends to read out the data element, only the corresponding logical memory address is known.

In accordance with an example embodiment of the present invention, the read address of the data element preferably includes, via the interface module, receiving a changed sub-data element of the read data element, forming a changed data element from the changed sub-data element and the unchanged portions of the read data element, calculating a changed error correction value based on the changed data element, and writing, starting at the memory address, the changed data element and immediately thereafter the calculated changed error correction value within one addressing phase. In this way, a read-write operation is implemented, with the aid of which, for example, so-called "read-modify-write" commands may be implemented. The modified or changed part of the read data word is inserted by the interface module into the read data word and a recalculation of the error correction value is also carried out by the interface module. These steps are not visible or transparent from the perspective of the software, so that they do not have to be adapted.

In accordance with an example embodiment of the present invention, the method preferably includes transmitting the data element to be stored from at least one processor core of the microprocessor to the interface module and/or transmitting the data element to be stored from the interface module to the at least one processor core of the microprocessor. Thus, the storing is carried out preferably by the microprocessor. It is also possible, however, that other functional elements of the microcontroller carry out a direct memory access (DMA) to the external memory; this then takes place also via the interface module.

In accordance with an example embodiment of the present invention, an interface module according to the present invention for the secured storing of a data element in an external memory is configured to carry out one of the aforementioned methods, in particular, is configured to calculate memory addresses and ECC values for data elements to be stored or for read data elements and is configured to map memory addresses of data elements in an address space of the microcontroller into memory addresses in an address space of the external memory, the memory space requirement of the ECC value being taken into account during the mapping.

A microcontroller according to the present invention includes an interface module according to the present invention and, preferably, at least one processor core, which is connected to the interface module.

A processing unit according to the present invention, for example, a control unit of a motor vehicle, includes a microcontroller according to the present invention and, preferably, an external memory, which is connected to the interface module.

The present invention is suitable, in particular, for so-called "Embedded Systems." These are understood to mean electronic computers, which are integrated (embedded) into a technical context. The computer in this case assumes either monitoring, controlling or regulating functions or is responsible for a form of the data processing or signal processing, for example, during encryption and decryption, coding or decoding or filtering. A typical requirement of embedded systems is the real-time capability. A processing at an unpredictable processing speed may not be tolerated. Many applications (in particular, controllers in safety-relevant systems—i.e., systems, via which a human could be endangered, injured or even killed) require a system with a predictable reaction time.

Further advantages and embodiments of the present invention result from the description herein and the figures.

The present invention is schematically represented in the figures based on exemplary embodiments and is described below with reference to the figures.

DETAILED DESCRIPTION OF EXAMPLE EMBODIMENTS

Figure 1A:
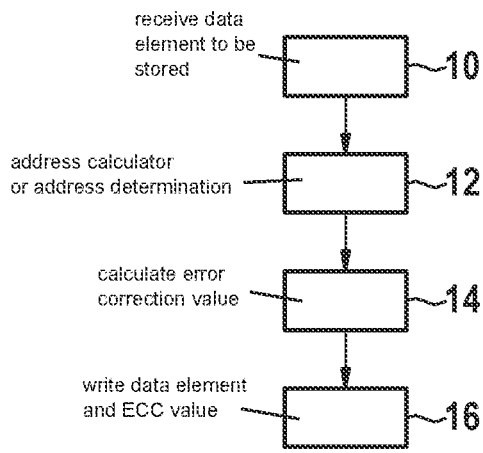
FIG. 1A shows a flowchart of a write operation according to one preferred specific embodiment of the method for secured storing in accordance with the present invention.

FIG. 1A represents a flowchart of a write operation for the secured storing of a data element in an external memory connected to a microcontroller according to one preferred specific embodiment of the present invention. In the description below (also in the additional figures), reference is made, in particular, to a data element and to an ECC value, this reference is for the purpose of language simplification and is to be read as meaning at least one data element and at least one ECC value. The present invention is therefore not restricted to one single data element.

The data element may be both program data, i.e., program instructions, as well as data that are used and, if necessary, changed by the computer program. In the method, an interface module is used, via which the external memory is connected to the microcontroller. The interface module is configured to carry out address calculations and error correction calculations.

In step 10, the data element to be stored is received by the interface module.

In step 12, an address calculation or address determination takes place, in which a memory address for the data element to be stored is calculated. Furthermore, an error correction value (ECC value) for the data element is calculated in step 14. Steps 12 and 14 (calculation of the memory address and of the ECC value) may, in contrast to that depicted, also be carried out in reverse order. Both steps 12, 14 are carried out by the interface module.

In step 16, the data element and the ECC value are written during a single addressing phase to the calculated memory address into the memory, i.e., the data element is written, starting at the calculated memory address, and the ECC value is written immediately following the data element. A calculation of an independent memory address for the ECC value is therefore not necessary.

Figure 1B:
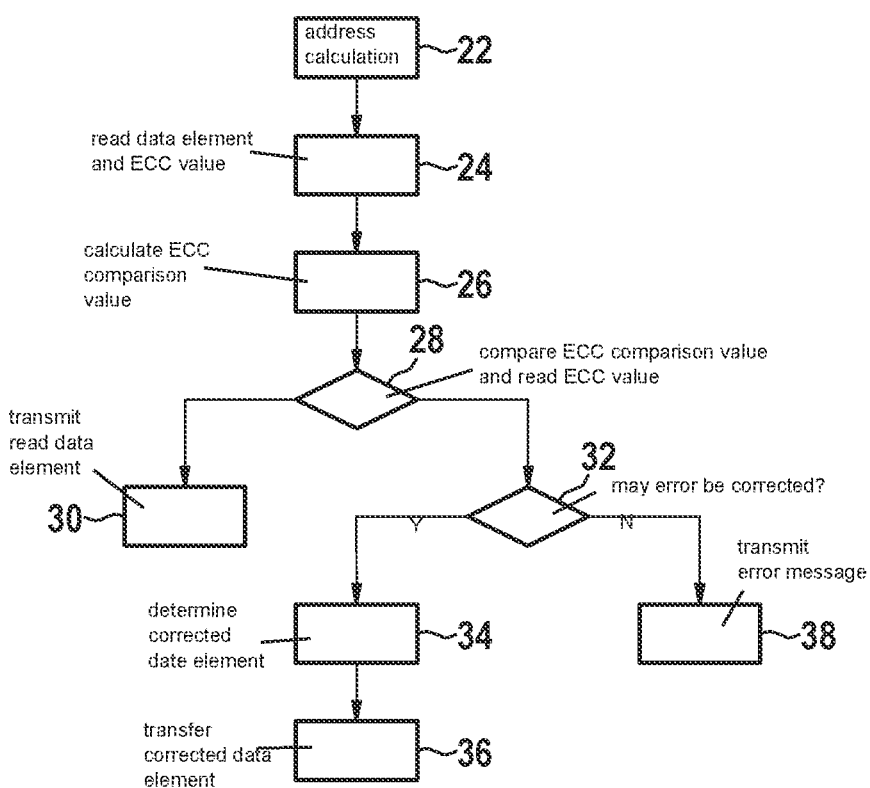
FIG. 1B shows a flowchart of a read operation according to one preferred specific embodiment of the method for secured storing in accordance with the present invention.

FIG. 1B represents a flowchart of a read operation according to one preferred specific embodiment of the method for the secured storing.

In step 22, an address calculation takes place, in which the memory address at which the data element is stored is determined. It should be noted here (and for the address calculation during the write operation) that the processor core of the microcontroller or a computer program executed therein in fact knows a logical address of the stored data element with which, from the perspective of the processor core, the computer program may be accessed, however, a physical address is determined by the address calculation at which the data element and the ECC value are actually being stored or are stored in the memory. The memory address, which is determined or calculated in step 22 (and previously in step 12), is the physical address. This address must therefore be recalculated or re-determined during the read operation. This determination of the memory address is carried out by the interface module; the processor core is not involved.

In step 24, starting at the memory address, the data element and the immediately subsequently stored ECC value, are read from the memory. This takes place again within a single addressing phase, a separate addressing phase for reading out the ECC value is not necessary.

In step 26, an error correction comparison value (ECC comparison value) from the read data element is calculated by the interface module. This ECC comparison value is compared in step 28 with the read ECC value, i.e., with the ECC value valid during the writing of the data element. In the comparison, it is established whether the data element has been changed, thus, whether a memory error has occurred.

If the ECC comparison value is the same as the ECC value, i.e., if (in terms of the error correction method used) no memory error has occurred, the read data element is transmitted to the at least one processor core of the microcontroller, step 30.

If the ECC comparison value is not the same as the ECC value, i.e., if a memory error has occurred, it is initially checked in step 32 whether the error may be corrected. Whether this is possible depends on the error correction method used, with which the ECC value is calculated. If, for example, an 8-bit long ECC value is used for a 64-bit long data element, typically 1-bit errors may be identified and corrected and 2-bit errors may be identified but not corrected.

If it is established that the error may be corrected, the error is then corrected in step 34, i.e., a corrected data element is determined. The corrected data element is transferred in step 36 to the at least one processor core of the microcontroller. If, on the other hand, it is established that the error may not be corrected, a corresponding error message is transmitted in step 38 to the at least one processor core of the microcontroller.

Figure 2:
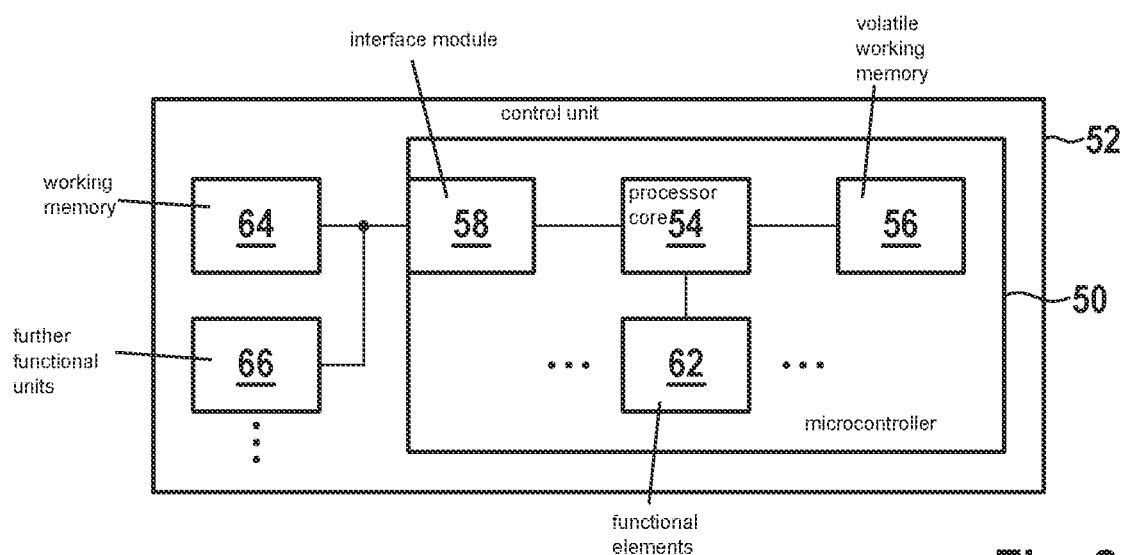
FIG. 2 shows a microcontroller, which may be preferably used for implementing the method according to the present invention.
Figure 3:
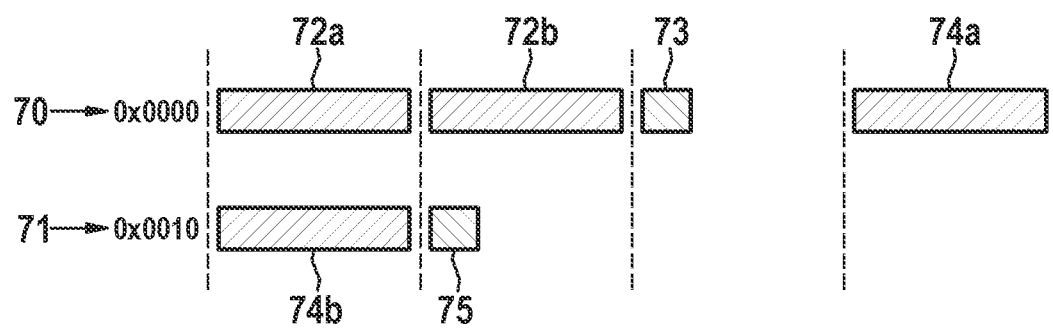
FIG. 3 shows an example of the arrangement of two data elements together with associated ECC values, as it is achieved by an example embodiment of the present invention.

During the write operation (FIG. 1A) or during the read operation (FIG. 1B), the calculation and determination of the memory address (step 12 and step 22) and the calculation of the ECC value (step 14) and of the ECC comparison value (step 26) are carried out by the interface module; cf. FIGS. 2 and 3. A change of the design or of the hardware of the processor core (or of the processor cores) is therefore not necessary. Computer programs may also be used or programmed without the need for knowledge about the interface module and the error correction method.

FIG. 2 represents a microcontroller 50, which may be used to carry out the method according to the present invention. Microcontroller 50 is integrated here by way of example in a control unit 52, for example, of a motor vehicle or of a machine controller. Microcontroller 50 includes at least one processor core 54, a (internal) volatile working memory 56 (DRAM, Dynamic Random Access Memory) connected thereto and an interface module 58 also connected to processor core 54. "Connected" is to be understood here and in the following in terms of a communication link for exchanging data, conductive connections are typically provided for this purpose, however, wireless connections (for example, radio or light) are also possible. The connections may be point-to-point connections or may be implemented via a bus; in each case serial or parallel communication may be provided. The three functional elements (processor core, working memory, interface) may be implemented as an integrated circuit in a single chip.

The at least one processor core 54 is configured to execute computer programs. The computer programs and data required and/or accruing during their execution are stored in working memory 56. Interface module 58 is used for the exchange of data between microcontroller 50 and external devices or functional units. Interface module 58 may include a serial or parallel interface, for example, a SPI interface (SPI, Serial Peripheral Interface, originally introduced by Motorola) or a refinement of the same. Interface module 58 is designed as a hardware module and is used in the error correction method.

The microcontroller may include further functional elements 62 connected to the processor core, for example, a non-volatile memory (for example, flash memory) or further interfaces (for example, a CAN bus interface). Further connections not shown between the individual functional elements may also be provided, for example, a direct connection between working memory 56 and interface module 58.

Also represented in FIG. 2 is an external working memory 64 not included in the microcontroller, which is connected to interface module 58. Further functional units 66 may also be connected via interface module 58 or via further interfaces to microcontroller 58 (in addition or alternatively to corresponding functional elements 62 in the microcontroller). Examples are again a non-volatile memory or further interfaces (for example, a CAN bus interface for communication between the control unit and other elements of the device that is controlled by the control unit).

The working memory, which microcontroller 50 or its processor core 54 is able to access, may be expanded by the external (volatile) working memory 64. Thus, programs may be stored at least partially in the external working memory during execution, for example, if the programs are too large for internal working memory 56. Although the access to external working memory 64 is slower than to internal working memory 56, the access is still significantly faster however than the access to a non-volatile memory in which the programs are permanently stored.

Memory accesses to external working memory 64 take place via interface module 58. In the case of a write access, an associated error correction value (ECC value), which is also to be stored in the external working memory, is calculated for each data element to be stored by interface module 58. The address calculation, i.e., the calculation of the memory address in external memory 64, at which the data element is to be stored, is also carried out by interface module 58. During writing, the data element is written to the memory address and the ECC value is written immediately thereafter, an independent address calculation for the ECC memory address, i.e., the memory address to which the ECC value is written, is therefore not necessary. In principle, the ECC memory address may be determined from the memory address and from the data element or its length to which the ECC value is written. In addition to the omission of an independent address calculation for the ECC value, it is also advantageous that the writing and, if necessary, the later reading of the data element and of the associated ECC value may be carried out normally within a burst access of the external working memory. A so-called "Burst Mode" is implemented in ordinary DRAM memories that are used as working memories, in this case, data stored in a memory row are written or read in direct succession so that the provision of further data contained in a memory row requires very little time as opposed to the provision of the first data contained in the memory row, since the memory row does not have to be reactivated (typical row lengths are 512 byte, 1 Kbyte, 2 Kbyte).

Since the address calculation is carried out by the interface module, the data are arranged from the perspective of the at least one processor core in linear succession, i.e. the at least one processor core is able to address data elements in a linear manner without taking the ECC values into account. A so-called "memory mapping" of the external working memory by the interface module takes place, the interface module carrying out a mapping between physical addresses of the external working memory and logical addresses of the processor core, the physical addresses are thus mapped into the address space of the processor core. Programs executed by the processor core may therefore address the external working memory without knowledge of the error correction, i.e., the programs do not have to be adapted.

FIG. 3 represents by way of example the arrangement between two data elements together with associated ECC values, as they are obtained by the present invention in the external working memory. Further data elements including associated ECC values not depicted may of course also be stored in the memory. In this case, 64-bit data elements and 8-bit ECC values are shown by way of example. In contrast to this example, the data elements and the ECC values may in general have an arbitrary length.

For example, the data elements may have a length of 8, 16, 32, 64, 128 bits, to name a few typical values. Similarly, the ECC values may also have other lengths, for example, 4, 8 or 16 bits, this depends on the ECC method used and may depend on the length of the data elements (for example, 8-bit data element length for each 1-bit ECC value length) or may also be independent thereof. A length of the ECC value of, for example, 8 bits (or of another invariably the same length) may also always be provided; typical combinations are then 8-bit data elements+8-bit ECC value, 16-bit data element+ 8-bit ECC value, 32-bit data element+8-bit ECC value and 64-bit data element+8-bit ECC value.

Two successive memory sections 70, 71 are shown, which start with the hexadecimal addresses 0x0000 and 0x0010, each address corresponding to one-byte (8 bits) and 4-byte sections each, i.e., 32-bit sections, being indicated by dashed lines. First data element 72*a*, 72*b* is stored starting at address 0x0000, the 64 bits of the first data element being plotted as two 32-bit elements 72*a*, 72*b*. First data element 72*a*, 72*b* is followed immediately, i.e., starting at memory address 0.0008, by associated ECC value 73, which may have a length of 8 bits, for example.

Second 64-bit data element 74*a*, 74*b* starts in this example at memory address 0x000C and again includes two 32-bit words 74*a*, 74*b*. It should be noted here that 32-bit words in this example are aligned with 32-bit sections in the working memory. If the ECC value is shorter than 32 bits, a section in the memory accordingly remains free (in the case of an 8-bit ECC value, for example, the section from 0x0009 to 0x000B remains free). ECC value 75 associated with the second data element is stored immediately after second data element 74*a*, 74*b*, i.e., at memory address 0x0014.

Using this arrangement, the 64-bit data elements and the associated ECC values may be written or read, in each case using merely the respective memory address (0x0000 and 0x000C in the example of FIG. 3). This means, data element and associated ECC value form a composite data element, which may be addressed with the aid of a single memory address and may thus be written or read in a single addressing phase. An addressing phase related to the first data element would involve here, starting for example, at memory address 0x0000, 9 bytes (72 bits=64-bit data element+8-bit ECC value), i.e., addresses 0x0000 to and including 0x0008.

What is claimed is:

1. A method for a secured storing of a data element in an external memory, which is connected to a microcontroller via an interface module, which is configured to calculate memory addresses for data elements to be stored and for error correction values for data elements, the method comprising the following steps carried out by the interface module:
   receiving the data element to be stored;
   calculating a memory address in the external memory for the data element to be stored;
   calculating an error correction value for the data element;
   writing the data element and the error correction value into the external memory starting at the memory address, the error correction value being written immediately following the data element and the writing taking place within one addressing phase;
   performing a read operation of the written data element from the external memory, the performing of the read operation including the following steps carried out by the interface module:
   determining the memory address of the data element;
   reading the data element and the error correction value within one addressing phase from the external memory;
   calculating an error correction comparison value from the read data element; and
   comparing the error correction comparison value with the read error correction value to establish whether the error correction comparison value and the read error correction value are the same or are not the same;
   transmitting, by the interface module to at least one processor core of the microcontroller, the read data element when the error correction comparison value and the read error correction value are the same; and
   transmitting, by the interface module to the at least one processor core, a data element corrected based on the read data element and the read error correction value when the error correction comparison value and the read error correction value are not the same.

2. An interface module for a secured storing in an external memory, wherein the interface module is configured to:
   receive data elements to be stored;
   for each respective one of the data elements to be stored:
   calculate a respective first memory address of a plurality of memory addresses in an address space of the external memory for the respective data element to be stored;
   calculate a respective error correction value for the respective data element; and
   within one addressing phase, write the respective data element and the respective error correction value as a single unit into the external memory starting at the first memory address, by which the error correction value is written at a respective second memory address that immediately follows the respective data element without a separate calculation of the second memory address for the respective error correction value independent of the calculation of the respective first memory address; and map memory addresses of the data elements in an address space of a microcontroller into the memory addresses in the address space of the external memory, a memory space requirement of the error correction value being taken into account during the mapping.

3. A microcontroller comprising:
an interface module for a secured storing in an external memory; and
at least one processor core connected to the interface module, wherein the interface module is configured to:
receive data elements to be stored; and
for each respective one of the data elements to be stored:
calculate a respective first memory address in the external memory for the respective data element to be stored;
calculate a respective error correction value for the respective data element; and
within one addressing phase, write the respective data element and the respective error correction value as a single unit into the external memory starting at the first memory address, by which the error correction value is written at a respective second memory address that immediately follows the respective data element without a separate calculation of the second memory address for the respective error correction value independent of the calculation of the respective first memory address.

4. A method for a secured storing of a data element in an external memory, which is connected to a microcontroller via an interface module, which is configured to calculate memory addresses for data elements to be stored and for error correction values for data elements, the method comprising the following steps carried out by the interface module:
receiving the data element to be stored;
calculating a memory address in the external memory for the data element to be stored;
calculating an error correction value for the data element;
writing the data element and the error correction value into the external memory starting at the memory address, the error correction value being written immediately following the data element and the writing taking place within one addressing phase;
wherein at least one of the following three features (1)-(3):
(1) the method further comprises a read operation of the written data element from the external memory including the following steps carried out by the interface module:
determining the memory address of the data element;
reading the data element and the error correction value within one addressing phase from the external memory;
calculating an error correction comparison value from the read data element; and
comparing the error correction comparison value with the read error correction value to establish whether the error correction comparison value and the read error correction value are the same or are not the same;
(2) the data element to be stored is transmitted from at least one processor core of the microcontroller to the interface module; and (3) the method further comprises mapping, by the interface module, a memory address of the data element in an address space of the microcontroller into the memory address in an address space of the external memory, a memory space requirement of the error correction value being taken into account during the mapping.

5. The method as recited in claim 4, wherein the method further comprises the mapping, by the interface module, of the memory address of the data element in the address space of the microcontroller into the memory address in the address space of the external memory, the memory space requirement of the error correction value being taken into account during the mapping.

6. The method as recited in claim 4, wherein the method further comprises the read operation of the written data element from the external memory including the following steps carried out by the interface module:
the determining of the memory address of the data element;
the reading of the data element and the error correction value within one addressing phase from the external memory;
the calculating of the error correction comparison value from the read data element; and
the comparing of the error correction comparison value with the read error correction value to establish whether the error correction comparison value and the read error correction value are the same or are not the same.

7. The method as recited in claim 6, further comprising the following steps carried out by the interface module:
transmitting the read data element when the error correction comparison value and the read error correction value are the same; and
transmitting a data element corrected based on the read data element and the read error correction value when the error correction comparison value and the read error correction value are not the same.

8. The method as recited in claim 6, further comprising the following steps carried out by the interface module:
receiving a changed sub-data element of the read data element;
forming a changed data element from the changed sub-data element and from unchanged portions of the read data element;
calculating a changed error correction value based on the changed data element; and
writing, starting at the memory address, the changed data element and immediately thereafter the changed error correction value into the external memory within one addressing phase.

9. The method as recited in claim 4, wherein the data element to be stored is transmitted from the at least one processor core of the microprocessor to the interface module.

10. An interface module for a secured storing of a data element in an external memory, the interface module configured to:
receive the data element to be stored;
calculate a memory address in the external memory for the data element to be stored;
calculate an error correction value for the data element;
write the data element and the error correction value into the external memory starting at the memory address, the error correction value being written immediately following the data element and the writing taking place within one addressing phase;

wherein at least one of the following three features (1)-(3):
(1) the interface module is configured to perform a read operation of the written data element from the external memory, the read operation including the following steps:
determining the memory address of the data element;
reading the data element and the error correction value within one addressing phase from the external memory;
calculating an error correction comparison value from the read data element; and
comparing the error correction comparison value with the read error correction value to establish whether the error correction comparison value and the read error correction value are the same or are not the same;
(2) the data element to be stored is transmitted to the interface module from at least one processor core of a microcontroller, the microcontroller being connected to the external memory by the interface module; and
(3) the interface module is configured to map a memory address of the data element in an address space of the microcontroller into the memory address in an address space of the external memory, a memory space requirement of the error correction value being taken into account during the mapping.

11. The interface module as recited in claim 10, wherein the interface module is configured to perform the read operation of the written data element from the external memory, the read operation including:
the determining of the memory address of the data element;
the reading of the data element and the error correction value within one addressing phase from the external memory;
the calculating of the error correction comparison value from the read data element; and
the comparing of the error correction comparison value with the read error correction value to establish whether the error correction comparison value and the read error correction value are the same or are not the same.

12. The interface module as recited in claim 10, wherein the data element to be stored is transmitted to the interface module from the at least one processor core of the microcontroller, the microcontroller being connected to the external memory by the interface module.

13. A method for a secured storing in an external memory connected to a microcontroller via an interface module, the method comprising the following steps carried out by the interface module:
receiving data elements to be stored; and
for each respective one of the data elements to be stored:
calculating a respective first memory address in the external memory for the respective data element to be stored;
calculating a respective error correction value for the respective data element; and
within one addressing phase, writing the respective data element and the respective error correction value as a single unit into the external memory starting at the first memory address, by which the error correction value is written at a respective second memory address that immediately follows the respective data element without a separate calculation of the second memory address for the respective error correction value independent of the calculation of the respective first memory address;
wherein:
the data elements are received from a processor core of the microcontroller; and
the processor core is connected to an internal memory of the microcontroller that is accessible by the processor core faster than the external memory is accessible by the interface module.

* * * * *